(12) United States Patent
Bredin et al.

(10) Patent No.: US 6,286,072 B1
(45) Date of Patent: Sep. 4, 2001

(54) SYSTEM AND METHOD FOR SYNCHRONIZING DATA COMMUNICATION BETWEEN ASYNCHRONOUS BUSES

(75) Inventors: Francis Bredin, Maisons-Alfort; Claude Sitbon, Moret-sur-Loing, both of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/131,948

(22) Filed: Aug. 10, 1998

(30) Foreign Application Priority Data

Aug. 19, 1997 (EP) .................................................. 97480055

(51) Int. Cl.⁷ .............................. G06F 13/38; G06F 13/40
(52) U.S. Cl. ........................ 710/126; 710/128; 710/129; 710/57; 710/100; 709/223; 327/142; 365/221
(58) Field of Search ..................................... 710/126, 128, 710/100, 129, 57; 709/223; 327/142; 365/221

(56) References Cited

U.S. PATENT DOCUMENTS

| 5,473,756 | 12/1995 | Traylor ................................. 395/250 |
| 5,506,809 | 4/1996 | Csoppenszky et al. ............. 365/221 |
| 5,673,399 * | 9/1997 | Guthrie et al. ....................... 710/128 |
| 5,761,427 * | 6/1998 | Shah et al. ........................... 709/223 |
| 5,790,831 * | 8/1998 | Lin et al. .............................. 395/500 |
| 5,796,963 * | 8/1998 | Odom .................................... 710/128 |
| 5,941,964 * | 8/1999 | Young et al. ......................... 710/100 |
| 5,942,924 * | 8/1999 | Callahan .............................. 327/142 |

FOREIGN PATENT DOCUMENTS 0 629 956  12/1994  (EP) ............................. G06F/13/40

OTHER PUBLICATIONS

IBM Technical Disclosure Bulletin, vol. 38, No. 5, May 1995 "60X Bus–to–PCI Brfidge".

* cited by examiner

Primary Examiner—Rupal D. Dharia
(74) Attorney, Agent, or Firm—Daniel E. McConnell

(57) ABSTRACT

A synchronization circuit for use in a bridge connecting an emitter bus operating on an emitter clock frequency to a receiver bus operating on a receiver clock frequency is provided. The synchronization circuit is responsive to a control signal generated by memory status means coupled to a memory which temporarily stores data transmitted from the emitter bus to the receiver bus. The control signal representative of the status of the memory is reflecting asynchronous read and write operations within the memory. The resultant signal output from the synchronization circuit is a one clock synchronized signal such that rising and falling transitions are synchronized to the receiver bus clock frequency.

9 Claims, 7 Drawing Sheets

SYSTEM AND METHOD FOR SYNCHRONIZING DATA COMMUNICATION BETWEEN ASYNCHRONOUS BUSES

TECHNICAL FIELD

The present invention relates to bridges for interconnecting buses in a multiple bus computer environment, and more particularly, to a bridge into which is incorporated a system for synchronizing data transfers between asynchronous buses.

BACKGROUND ART

Computer systems typically include more than one bus, each bus in the system having devices attached thereto which communicate locally with each other over the bus. Examples of the different types of buses present in typical computer systems are a system bus to which a host central processing unit is attached and one or more peripheral buses. To permit system-wide communication between devices attached on different buses, bus-to-bus bridges or interfaces are provided to match the communications protocol of one bus with that of another.

Different bus-to-bus bridges are described in the following documents from IBM Corporation: Technical Disclosure Bulletin Vol. 38 No. 5, May 95, pp. 401–402 and EP 0 629 956 A2. These applications describe mechanisms which permit system-wide communication of devices attached to different buses in the system.

Each bus-to-bus bridge in a multi-bus computer system is used to connect two buses in the system. Various types of buses are available to construct a given computer system. One such bus which is becoming widely accepted is the PCI (Peripheral Component Interconnect) bus, which is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus.

A typical architecture of a communication system which is used to transfer data between an emitter bus to a receiver bus includes a memory within the interface device which temporarily stores data received from the emitter bus before being unloaded to the receiver bus. Interfacing an emitter bus to a receiver bus is problematic when the two buses are asynchronous each other. A write operation performed to input data into the interface circuit is externally monitored by a write clock which is synchronous to the emitter bus clock, whereas a read operation performed to output data from the interface circuit is externally monitored by a read clock which is synchronous to the receiver bus clock.

Moreover to monitor each of the read and write operations inside the memory, a control signal is generated to indicate the status of the memory, e.g. if it is empty or not, and thus allowing or preventing a read or a write operation. If no data are stored thereby meaning that no read operations are to be performed, a flag 'empty' is asserted. When data are ready to be output a flag 'not-empty' is asserted.

In asynchronous systems wherein the read and write operations are independently clocked, the pulse duration of the flag 'not-empty' reflects the data traffic between the two buses. It is, therefore, mandatory that this control signal be accurate to clearly state to the receiver bus when data are available, and thus to perform the data transfer as efficiently as possible.

U.S. Pat. No. 5,506,809 discloses a system for generating such control signal named a status flag with the memory being a First-In- First-Out (FIFO) device. A write pointer indexed synchronously with a write clock signal is counting the available memory space for writing data into the FIFO and is compared to a read pointer indexed synchronously with a read clock signal, which counts the data to be output from the FIFO. The result of such comparison gives the value of the status flag. However, since two asynchronous clocks monitor both the read and the write operations within the FIFO, the status flag duration may be either shorter or longer than the receiver clock cycle, resulting in losing data or in the well-known metastability problem of the receiver system.

One common solution to this problem is to hold the flag pulse during at least one additional cycle whatever the value is (i.e. high level or low level), thereby ensuring that the receiver system has captured the valid level. However, such solutions are time consuming, which is not compliant with the high speed buses architectures, such as the Peripheral Component Interconnect (PCI) bus. Accordingly, it would be desirable to be able to provide a new system which eliminates the aforementioned problems.

SUMMARY OF THE INVENTION

It is an object of the invention to provide a system which performs efficient data transfer between asynchronous buses. This object is achieved by employing a circuit which calibrates the width pulse of the memory status signal to the traffic of data being transmitted onto the receiver bus.

According to the present invention, a synchronization circuit for use in a bridge connecting an emitter bus operating on an emitter clock frequency to a receiver bus operating on a receiver clock frequency is provided. It is a feature of the invention that the synchronization circuit is responsive to a control signal generated by memory status means coupled to a memory which temporarily stores data transmitted from the emitter bus to the receiver bus. The control signal representative of the status of the memory is reflecting asynchronous read and write operations within the memory. The resulting signal output from the synchronization circuit is a one clock synchronized signal such that rising and falling transitions are synchronized to the receiver bus clock frequency.

In a preferred embodiment, the circuit comprises first detection means responsive only to falling transitions of the control signal for generating a first enabling signal, and second detection means responsive only to rising transitions of the control signal for generating a second enabling signal, whereby the first and second detection means being cross-coupled such that the first enabling signal operates as an enabling input to the second detection means and the second enabling signal operates as an enabling input to the first detection means. Moreover, clocked latching means are responsive to the first enabling signal and to the receiver bus clock for generating a clocked signal whereby the clocked signal operates as a restore input to the second detection means, and output means are responsive to the clocked signal and to the second enabling signal for generating the resultant synchronized signal.

In a preferred embodiment, the synchronization circuit is used in a bridge interfacing a PCI bus asynchronous to a Versa Module Eurocard (VME) bus, and the devices connected to each bus include audio or video boards, graphics controllers, SCSI controllers, PCMCIA controllers, or others I/O devices.

DETAILED DESCRIPTION OF THE INVENTION

Figure 1:
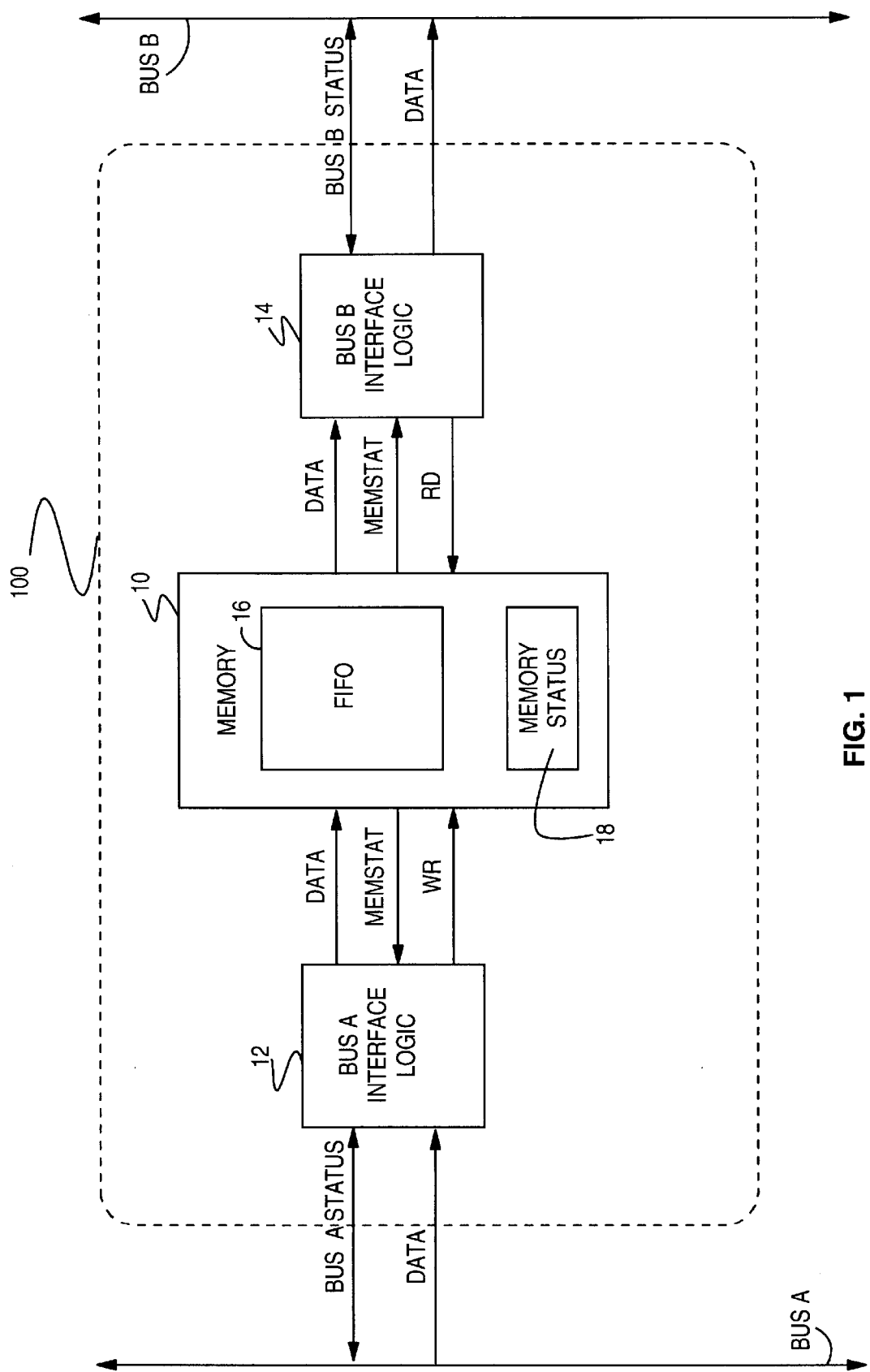
FIG. 1 is a typical implementation of an interface device.

Referring now to the drawings, and more particularly to FIG. 1, a typical implementation of a bridge 100 is shown. An Emitter bus referred to as 'BUS A' is connected to the bridge in order to input data which are to be transferred from a component coupled to the Emitter bus to another component coupled to a Receiver bus. The bridge 100 comprises a memory area (10) and bus interface logic (12, 14). The memory area (10) is composed of a temporary storage area (16) and status circuitry (18). The temporary memory (16) is shown as a First In First Out (FIFO) but may be any other storage device. A write pulse 'WR' controls the data loading operation synchronously to an emitter clock 'CLOCKA' which is the clock of bus A. Similarly, a read pulse 'RD' controls the data unloading operation synchronously to a receiver clock 'CLOCKB' of bus B. A control signal referred to as 'MEMSTAT' is output from status circuitry (18) to indicate the status of the memory. It enters the bus interface logic (12, 14) from which the read and write pulses (RD, WR) are generated.

Figure 2:
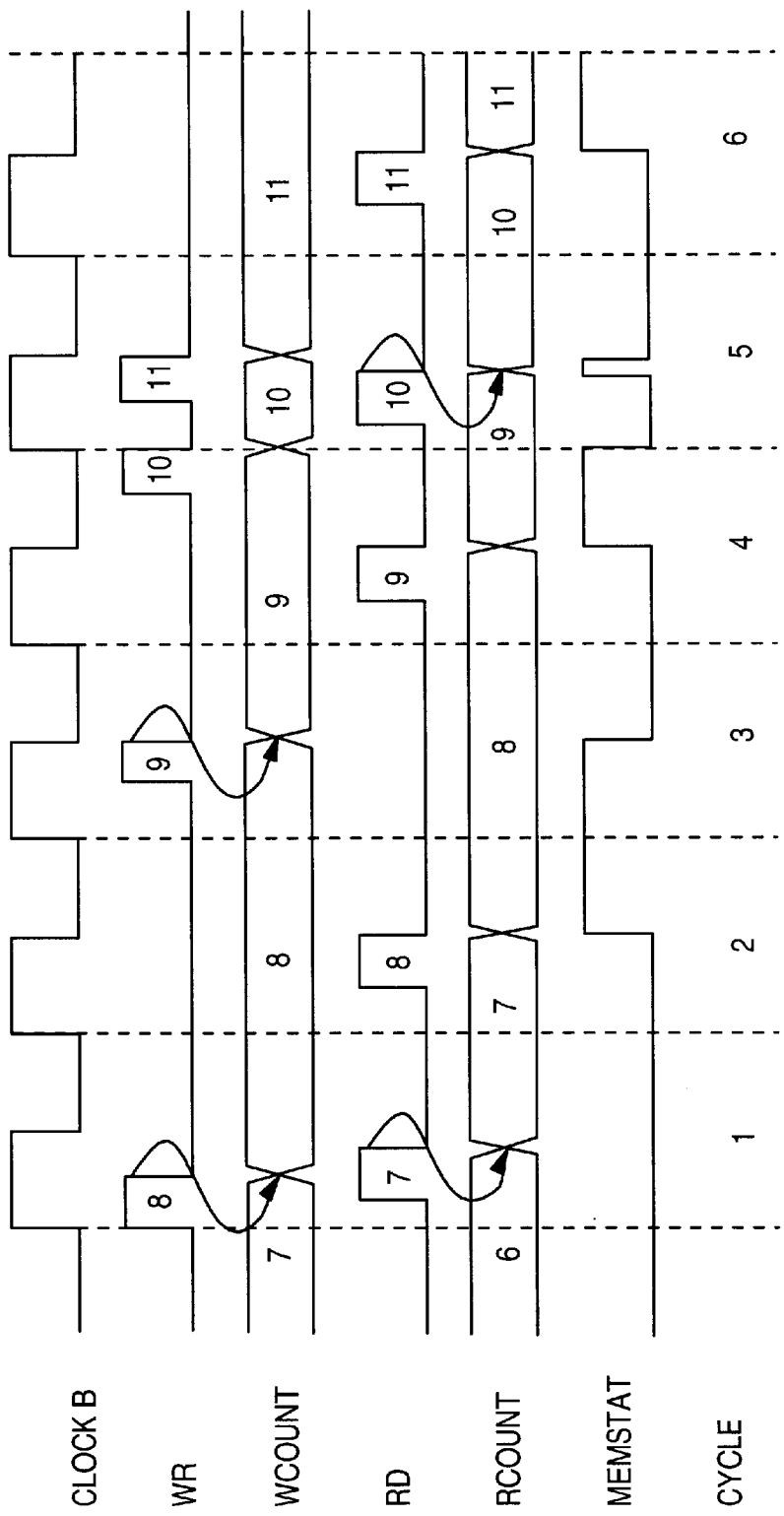
FIG. 2 is a waveform diagram of the signals used in the system of the prior art.

FIG. 2 is a timing diagram in a system of the prior art showing the generation of the control signal issued from different states of the read and write pulses. As it is fully described in the aforementioned patent U.S. Pat. No. 5,506,809, a write pulse 'WR' increments a write counter 'WCOUNT' each time a data is loaded. In the same way a read pulse 'RD' increments a read counter 'RCOUNT' each time a data is unloaded. A comparison between the content of both counters determines the value (high or low) of the status flag 'MEMSTAT'. It is understood that the circuit as used in the cited patent is one possible implementation for generating a control signal, but the invention could be used with other implementation such as the one described in U.S. Pat. No. 5,473,756 based on the use of circular shift registers.

The timing diagram of FIG. 2 is now detailed with reference to the cycle of the receiver clock to emphasize the drawbacks of the prior art systems. In a first cycle, an occurrence of a write pulse 'WR' triggers a write operation. In this example, the eighth data is written into the memory 16. A write counter 'WCOUNT' is incremented to '8' and thus its content indicates that the eighth data is stored. In the same cycle, an occurrence of a read pulse 'RD' triggers a read operation of the seventh data stored. A read counter 'RCOUNT' is then incremented to '7'. The values of both counters in this first cycle are different which has the meaning that valid data are still ready to be read.

Following with the second cycle, no write pulse is generated while an occurrence of a eighth read pulse increments the read counter to the eighth value.

The values of the read and the write counters are thus identical meaning that the memory is empty, and the 'MEMSTAT' flag is therefore deasserted to a high level representing the change of the memory status.

In the next cycle (cycle 3), a new write pulse occurs thereby modifying the value of the write counter. The consequence is that the 'MEMSTAT' flag is asserted to a low level because the values of both counters become different.

During cycle 4, the 'MEMSTAT' flag is de-asserted (to a high level) after the occurrence of a ninth read pulse. When the tenth write pulse occurs, the write counter is normally incremented, thus modifying the 'MEMSTAT' state to a low level. In the example, the transition of the write pulse occurs at the end of cycle 4; i.e., in a domain where hardware metastability problems may occur in the receiving system (the interface bus logic) to which the 'MEMSTAT' flag is applied. As will be fully described later, the system of the invention suppresses the risk of metastability.

Another potential problem of known interface systems is illustrated in cycle 5 wherein a read pulse and a write pulse occur simultaneously, thereby providing a transient state (also known as a glitch) of the 'MEMSTAT' signal which could lead to an erroneous status indication.

Figure 3:
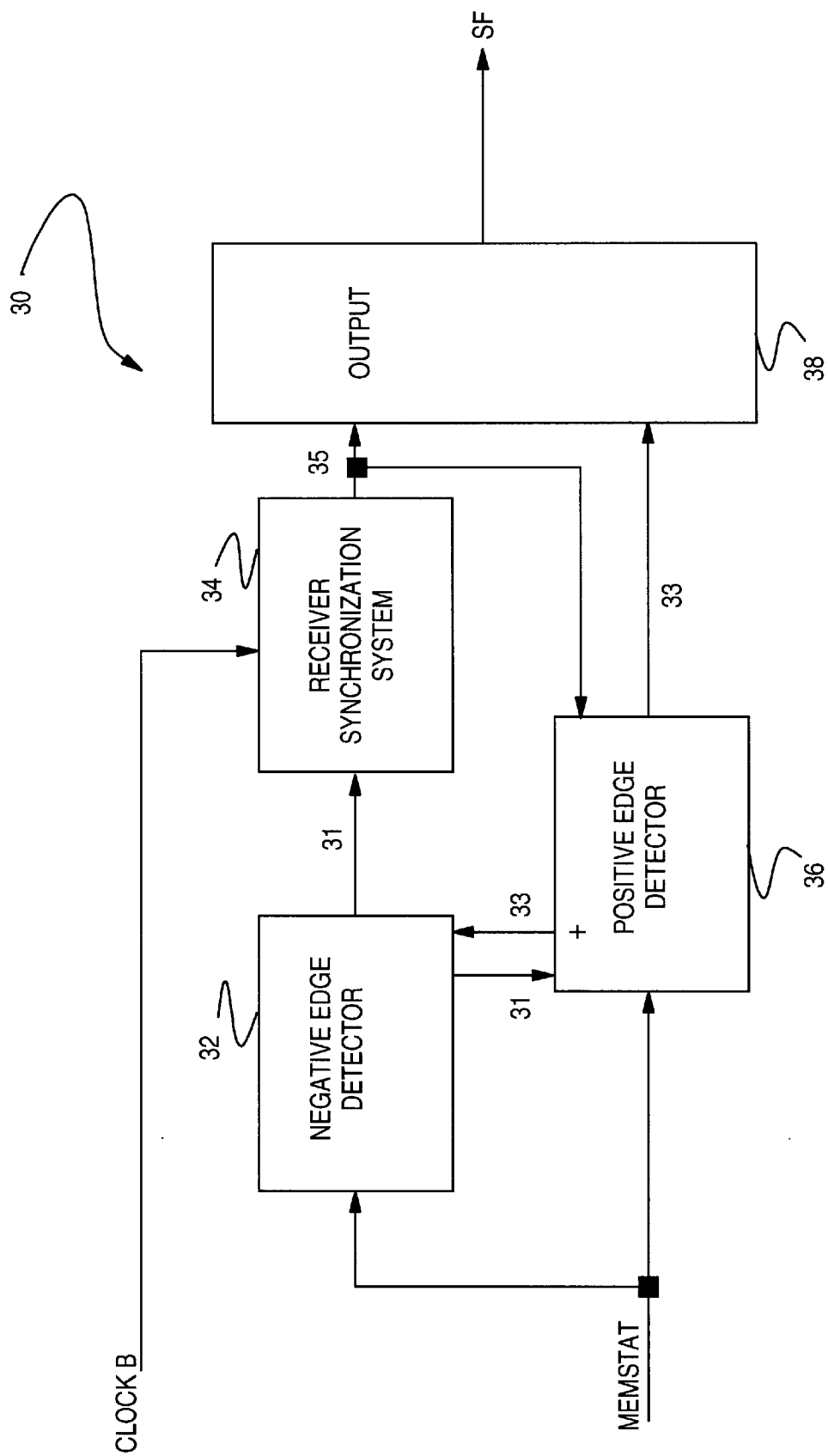
FIG. 3 is a functional block diagram of the system of the invention.

Referring now to FIG. 3, a functional block diagram of the system of the present invention is shown. The present invention separately controls each edge transition (positive and negative) of the 'MEMSTAT' signal in order to eliminate the risk of metastability of the bus interface circuitry as previously explained. For that purpose, two different paths are implemented, each path responsive to a transition type (low-to-high or high-to-low) of the control signal. As in prior art systems, the operation of loading data is clocked by the write pulse occurrences 'WR' synchronously with the emitter bus clock, while the operation of unloading data is clocked by the read pulse 'RD' synchronously with the receiver bus clock.

As shown on FIG. 3, the synchronization circuit 30 includes a Negative Edge Detector 32, a Receiver Synchronization System 34, a Positive Edge Detector 36, and an Output circuit 38.

The Negative Edge Detector 32 is connected thru line 31 to the Receiver Synchronization System 34 and to the Positive Edge Detector 36. The Receiver Synchronization System 34 is connected thru line 35 both to the Output circuit 38 and to the Positive Edge Detector 36. The Positive Edge Detector 36 is connected through line 33 to the Negative Edge Detector 32 and to the Output circuit 38.

The Negative Edge Detector 32 senses and holds the negative edge transition of the 'MEMSTAT' signal. The output 31 of the Negative Edge Detector is input to the Receiver Synchronization System which synchronizes the input signal in accordance to the receiver clock bus (CLOCK B).

The output 31 of the Negative Edge Detector also acts as an enabling input 31 for the Positive Edge Detector 36. The synchronized signal 35 output from the Receiver Synchronization System is input to the Output circuit 38 to be later output as a signal flag 'SF' sent to the interface bus circuitry of the receiver bus.

The Positive Edge Detector 36 senses and holds the positive edge transition of the 'MEMSTAT' signal. The output 33 of the Positive Edge Detector is input to the Output Circuit 38 to be sent to the interface bus circuitry coupled to the receiver bus. The output of the Positive Edge Detector also acts as an enabling input 33 for enabling the Negative Edge Detector 32.

Firstly, assume that a negative edge of the MEMSTAT occurs. It is captured by the Negative Edge Detector 32 before being synchronized in the Receiver Synchronization System and output as the 'SF' signal. Simultaneously to the holding of the negative edge of MEMSTAT, the Positive Edge Detector is enabled to be later activated on the occurrence of a positive edge transition of MEMSTAT.

After the last available data stored in the FIFO has been read, the 'MEMSTAT' signal rises to a high level. This rising transition is captured and memorized by the Positive Edge Detector 36. It is sent with no delay to the Output circuit 38 to generate the Output signal 'SF'. It is clear that in this positive edge path, the SF signal is generated without any additional cycle delay as regard to the occurrence of the 'MEMSTAT' rising edge, thereby avoiding any undesirable data to be sent to the receiver bus.

Furthermore, the activation of the Positive Edge Detector 36 disables the Negative Edge Detector from any occurrence of a MEMSTAT pulse, and thereby resetting it to a standby state.

The reset state of the Negative Edge Detector is propagated through the Receiver Synchronization System and input to the Positive Edge Detector to restore it. Finally, the reset of the latter enables the Negative Edge Detector to sense an incoming MEMSTAT negative edge transition.

Moreover, it has to be noted that the proposed architecture is glitch free because the Positive Edge Detector is arranged to avoid that any fluctuation of 'MEMSTAT' be captured by the Negative Edge Detector until the reset action has been completed.

Finally, with the system of the invention, the 'SF' signal is on one hand a one-cycle clock delayed signal (i.e. for every negative edge transition of the MEMSTAT signal the SF signal occurs one cycle later), and on the other hand is a trailing signal for each positive edge transition of 'MEMSTAT'.

Figure 4A:
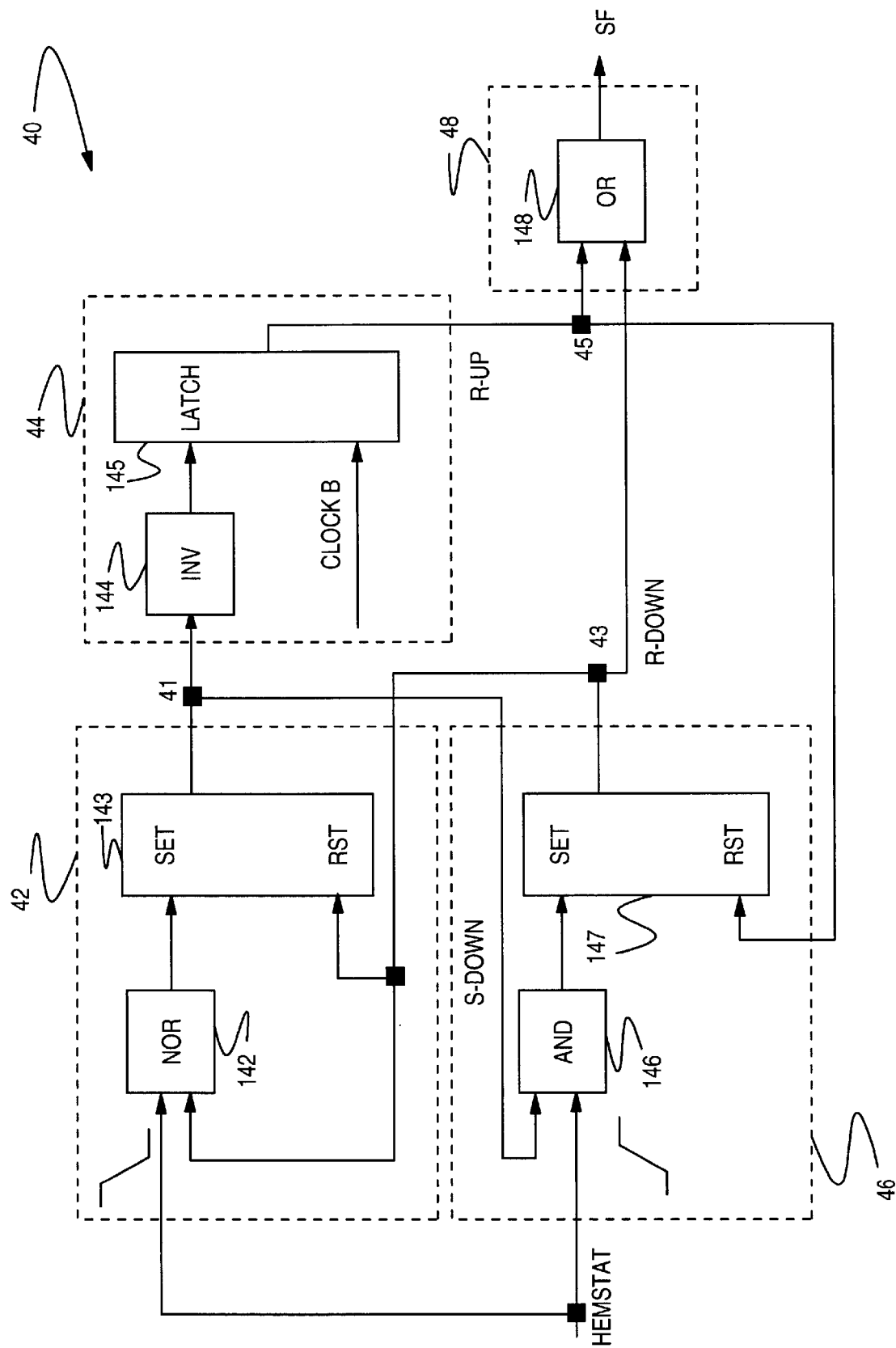
FIG. 4A is a preferred implementation of the system of the invention.

In a preferred embodiment, the circuit of the invention is implemented with logic circuits (42, 44, 46, 48) as shown on FIG. 4A. However, others logic circuits which operate the functions as previously described could be designed in various technologies. The Negative Edge Detector 42 is formed of a NOR logic gate 142 and a Set-Reset flip-flop 143. One input of the NOR gate is connected to receive the 'MEMSTAT' signal output from the memory 16. A second input of the NOR gate is connected to receive a signal R-DOWN on line 43 output from the Positive Edge Detector 46. The Set input of the Set-Reset 143 is connected to the output of the NOR gate 142. The Reset input of the Set-Reset 143 is connected to receive the signal 'R-DOWN' on line 43. The output of the Set-Reset 143 defines a signal 'S-DOWN' on line 41.

The Receiver Synchronization System 44 consists of an inverter 144 and a latch circuit 145. The input of 144 is connected to receive the output signal 'S-DOWN' from the Negative Edge Detector. A first input of the latch 145 receives the inverted signal 'S-DOWN' output from inverter 144. A second input of latch 145 is connected to receive the receiver bus clock signal 'CLOCKB'. The output of latch 145 generates a signal 'R-UP' on line 45.

The Positive Edge Detector 46 is formed of an AND logic gate 146 and a Set-Reset flip-flop 147. One input of the AND gate is connected to receive the 'MEMSTAT' signal output from memory 16. A second input of the AND gate is connected to receive the 'S-DOWN' signal on line 41. The Set input of the Set-Reset 147 is connected to the output of the AND gate 146. The Reset input of the Set-Reset 147 is connected to receive the signal 'R-UP' from the output of latch 147. The output of the Set-Reset 147 generates the signal 'R-DOWN' on line 43.

The Output Circuit 48 is made of a OR gate 148. A first input of gate 148 is connected to receive the signal 'R-UP' on line 45. A second input of OR gate 148 is connected to receive the signal 'R-DOWN' on line 43. The output of 148 defines the synchronized memory status signal 'SF'.

Figure 4B:
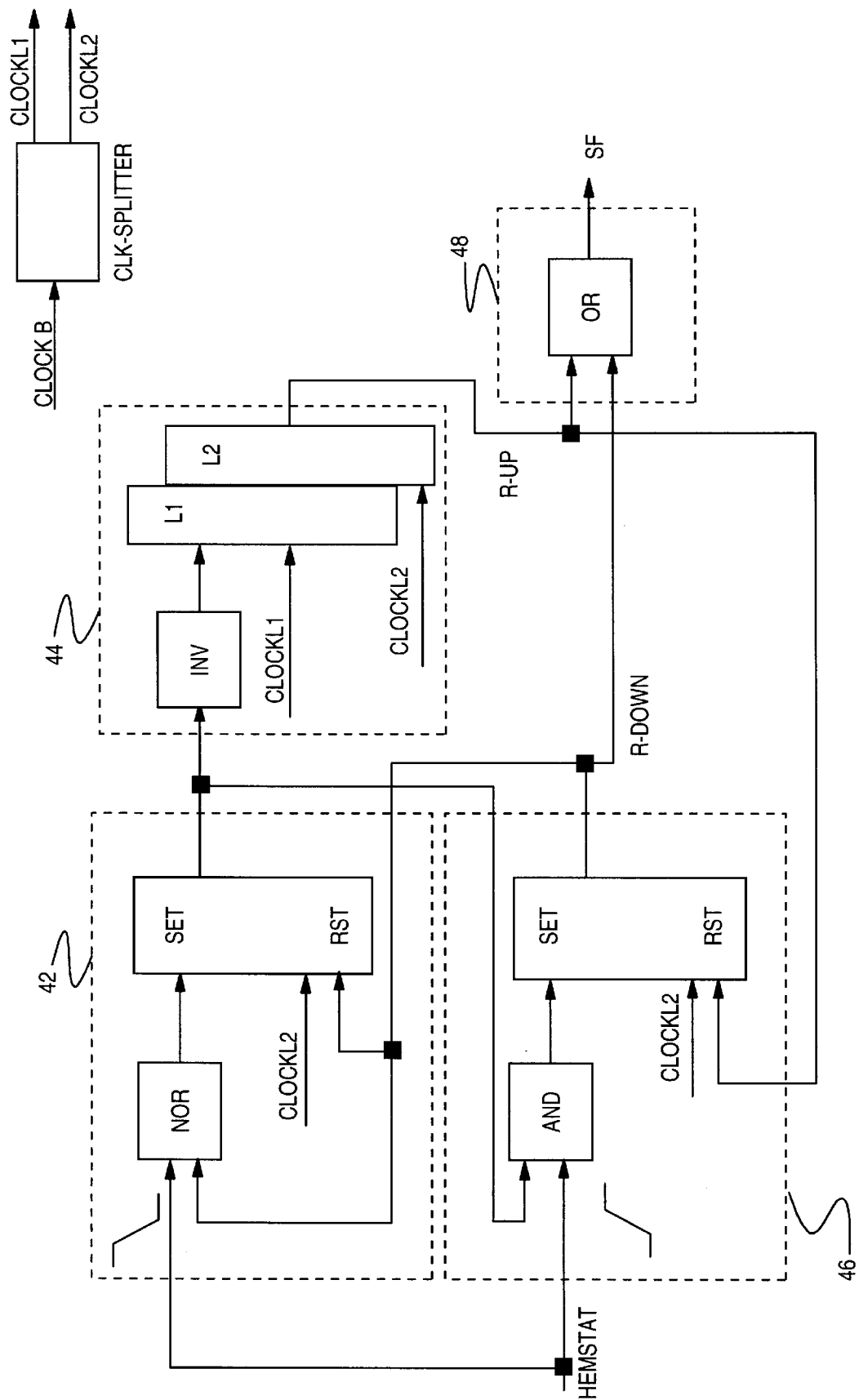
FIG. 4B is another implementation of the system of the invention consistent with LSSD rules.

In a particular embodiment of the invention, the circuit is consistent with the so-called Level Sensitive Scan Design (LSSD) rules. To conform with these rules, the latch circuit 145 of the Receiver Synchronization System is replaced by a LSSD-type latch (L1, L2), while clock signal CLOCKB is split into a first clock signal L1 (also known as master clock) applied to the latch L1 of circuit 145, and into a second clock signal L2 (also known as slave clock) applied to the latch L2 of circuit 145. In a particular implementation, the second clock signal L2 is also a third input to each Set-Reset circuits 143,147 as it is shown on FIG. 4B.

As those skilled in the art know, LSSD circuits follow specific guidelines to enhance their testability. Various documents describe these rules such as U.S. Pat. Nos. 3,761,695; 3,783,254 and 4,580,137. Therefore, it will be readily understood by a skilled person which modifications of the circuit of the invention may be made to be consistent with LSSD rules.

Figure 5:
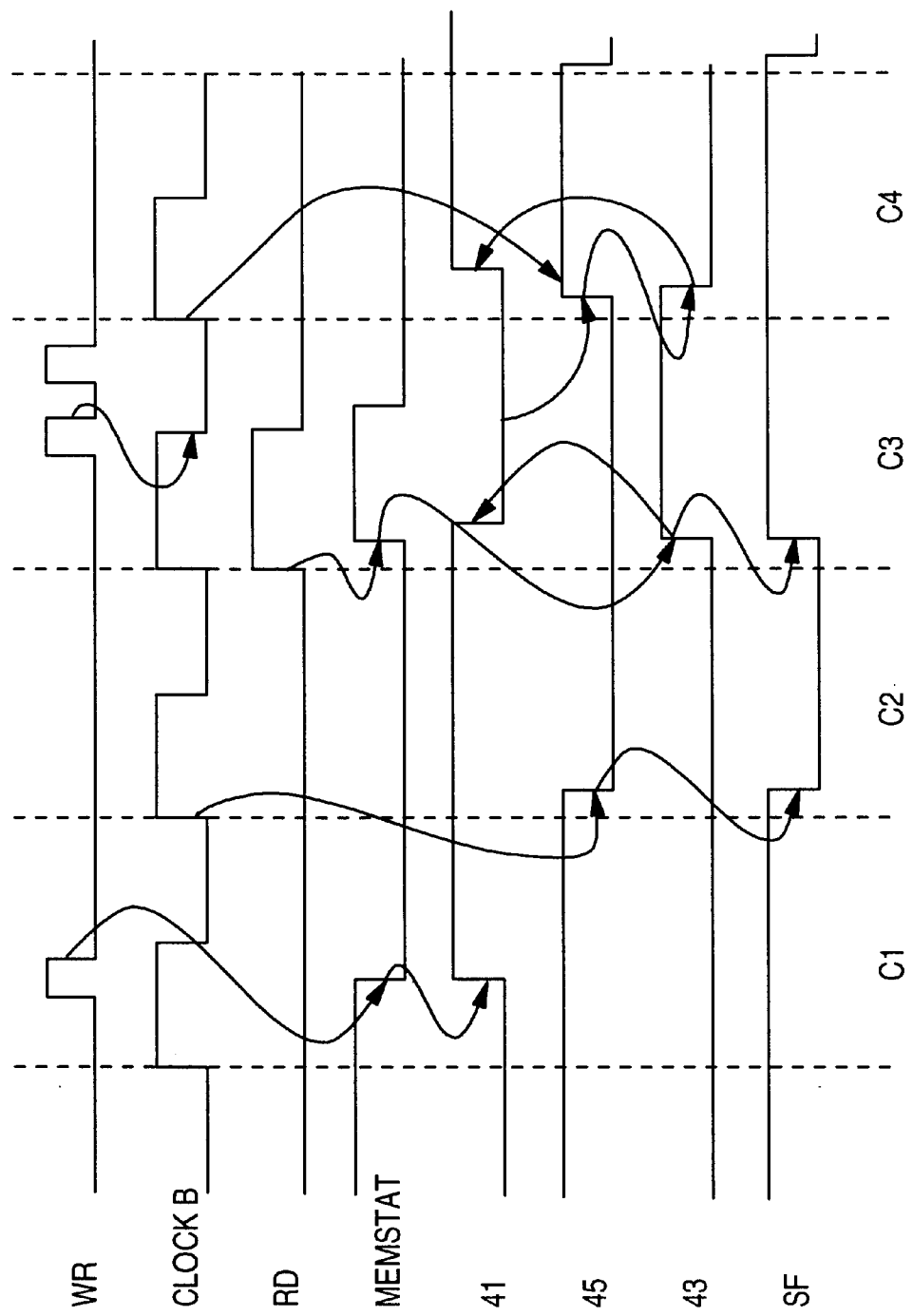
FIG. 5 is a waveform diagram illustrating the sequence of the signals of the invention.

In order to better understand the operation of the circuit of the invention, reference is now made to FIG. 5 which illustrates a sequence of the main signals through four cycles of the receiver bus clock (C1 to C4). Initially in order to describe the more general case it is assumed that the emitter bus clock and the receiver bus clock are free-running periodic waveforms, while the write pulse 'WR' and the read pulse 'RD' are asymmetric and aperiodic. However, the circuit of the invention will operate with any combination of asynchronous/synchronous clocks. Furthermore, it is assumed that before the first operation, both Set-Reset latches (143,145) are reset to a low level by a reset logic circuit (not shown) while the control signal 'MEMSTAT' is initialized to a high level.

In a first cycle C1, which is a data detection cycle, a first pulse of 'WR' occurs to allow the writing operation of a data into memory 16. On the high-to-low transition of 'WR' the control signal 'MEMSTAT' is asserted to a low level. This causes the output of the NOR gate 142 to be set to a logic "1" level. The output of the Set-Reset flip-flop 143 is thus set to a logic "1" on line 41.

The output of latch 145 is held to a high level on line 45 till the next positive transition of 'CLOCKB'. Since the input of the Set-Reset flip-flop 147 is a positive edge sensitive input, the falling edge transition of 'MEMSTAT' has no effect on it and the output 43 of 147 stays at a low level.

The second cycle C2 is a data synchronization cycle. At the positive transition of 'CLOCKB' the output of latch 145 switches from a high level to a low level on line 45. The low level on line 45 id ORed with the low level on line 43 to produce a low level of the Status Flag 'SF' at the Output Circuit 148.

In the third cycle C3, the positive transition of 'CLOCKB' acts as a read pulse 'RD' to output data from memory 16. In the chosen example of FIG. 5, it is assumed that only one data is stored into memory 16 and thus the 'MEMSTAT' signal goes to a high level after the read operation. Since the output of the Set-Reset flip-flop 143 is still high on line 41, it enables the input of the Set-Reset flip-flop 147 for receiving the positive edge transition of 'MEMSTAT'. The output of the Set-Reset flip-flop 147 then switches to a high level on line 43. The Ored combination of a low level on line 45 with a high level on line 43 causes the status flag 'SF' to go to a high level, thereby directly trailing the level of the 'MEMSTAT' signal.

The low-to-high transition of 'SF' indicates to the interface bus circuitry that there are no data to be read any more. It should be clearly understood that a data to be output from memory 16 is available during one cycle of the receiver clock, which is illustrated on FIG. 5 by the width of the status flag SF.

During cycle C3 new data are written into memory 16. The system of the invention is first refresh before a new data detection cycle is started. At the occurrence of the negative transition of 'WR' indicating that a new data has been written into the memory, the 'MEMSTAT' signal goes to a low level as in previous cycle C1, and stays low until the system has not be refresh.

At the next transition of the 'CLOCKB' signal, the high value previously hold in latch 145 is output on line 45 which reset the Set-Reset device 147, thereby providing a low level on line 43. This latter high-to-low transition on line 43 reset the Set-Reset device 143 providing a high level on its output 41 thereby initiating a new data detection cycle.

Figure 6:
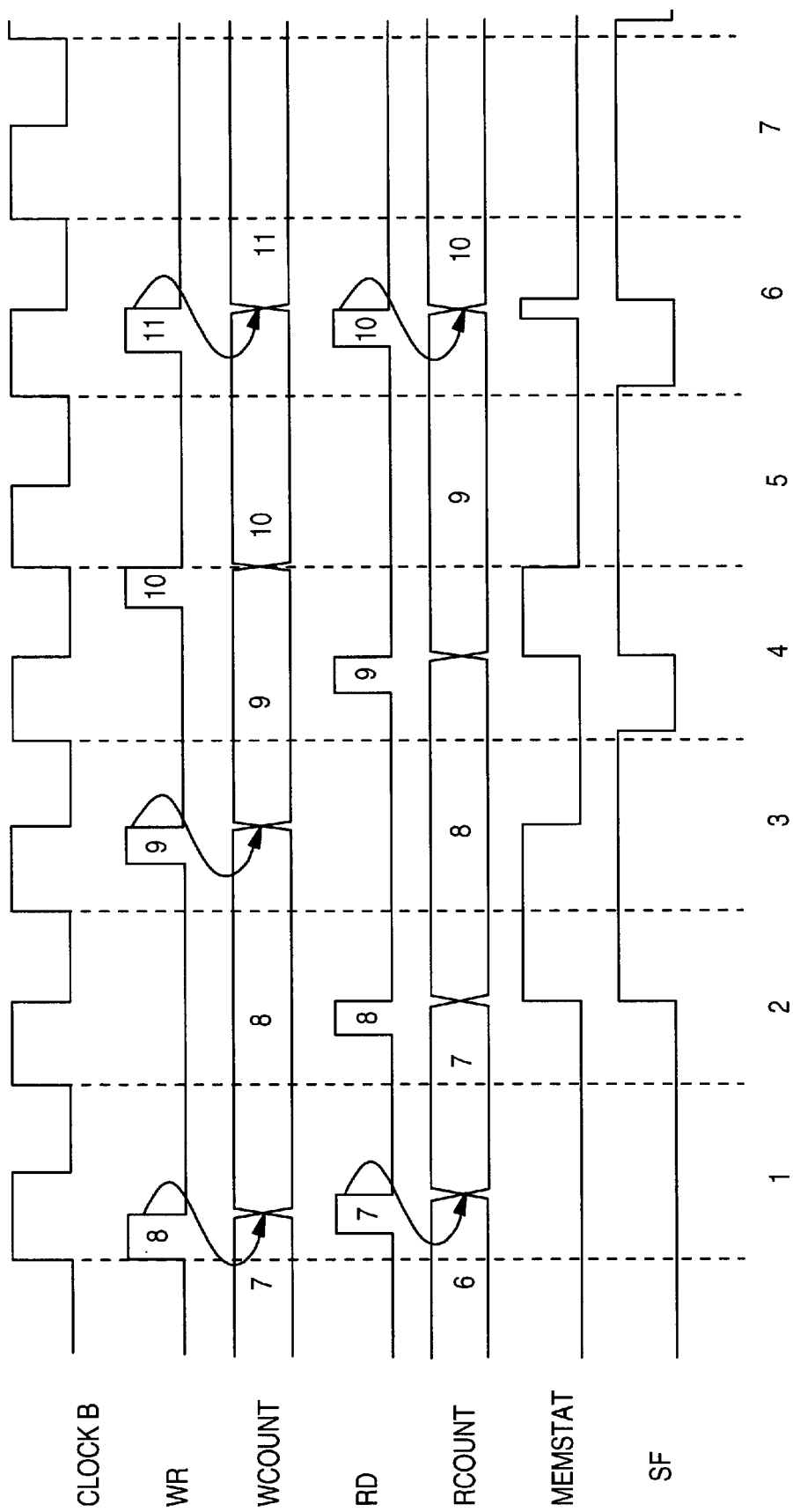
FIG. 6 is the generation of the status flag with the system of the invention according to the waveform diagram of FIG. 2.

FIG. 6 is provided with waveforms of the previous explained signals in the same cycle sequence than FIG. 2, in order to illustrate the absorption of the metastability risk and the undesirable glitch.

While the invention has been described in terms of preferred embodiments, those skilled in the art will recognize that the invention can be practiced with modification within the spirit and scope of the appended claims.

Having thus described our invention, what we claim is as follows:

1. A synchronization circuit for use in a bridge connecting an emitter bus operating on an emitter clock frequency to a receiver bus operating on a receiver clock frequency said bridge comprising:
   a memory for temporarily storing data transmitted from the emitter bus to the receiver bus;
   a memory status coupled to the memory for generating a control signal (MEMSTAT) indicating the status of said memory; and
   a synchronization circuit responsive to said control signal (MEMSTAT) for generating a synchronized signal (SF) such that rising and falling transitions of the synchronized signal (SF) are synchronized to the receiver clock frequency said synchronization circuit comprising:
      a Negative Edge Detector (NED) responsive to falling transitions of said control signal (MEMSTAT) for generating a first enabling signal;
      a Positive Edge Detector (PED) responsive to rising transitions of said control signal (MEMSTAT) for generating a second enabling signal, whereby the NED and PED are cross-coupled with the first enabling signal operates as an enabling input to the PED and the second enabling signal operates as an enabling input to the NED;
      a clock latch responsive to the first enabling signal and to the receiver bus clock for generating a clocked signal, whereby the clocked signal operates as a restore input to the PED; and
      an output circuit responsive to said clocked signal and said second enabling signal for generating said synchronized signal (SF).

2. The synchronization circuit of claim 1 wherein the NED comprises:
   a two-way NOR gate having a first input receiving said control signal (MEMSTAT) and a second input receiving the output of the PED; and
   a first clocked bistable device having a set-input receiving the output of the NOR gate, and a reset-input receiving the output of the PED.

3. The synchronization circuit of claim 1 wherein the PED comprises:
   a two-way AND gate having a first input receiving said control signal (MEMSTAT) and a second input receiving the output of the NED; and
   a second clocked bistable device having a set-input receiving the output of the AND gate, and a reset-input receiving the output of the clock latch.

4. The synchronization circuit of claim 2 wherein the PED comprises:
   a two-way AND gate having a first input receiving said control signal (MEMSTAT) and a second input receiving the output of the NED; and
   a second clocked bistable device having a set-input receiving the output of the AND gate, and a reset-input receiving the output of the clock latch.

5. The synchronization circuit of claim 4 wherein said receiver bus clock frequency is asynchronous to said emitter clock frequency.

6. The synchronization circuit of claim 4 wherein said emitter bus is a PCI bus and said receiver bus is a VME bus.

7. The synchronization circuit of claim 4 wherein said memory is a First-In-First-Out memory.

8. The synchronization circuit of claim 4 wherein said synchronization circuit is consistent with LSSD guidelines.

9. The synchronization circuit of claim 4 wherein said emitter bus is a system bus, said receiver bus is a peripheral bus and further comprising:
   a first plurality of devices connected to said emitter bus; and
   a second plurality of devices connected to said receiver bus, and wherein said first and second plurality of devices including audio or video boards, graphics controllers, SCSI controllers, PCMCIA controllers, or others I/O devices.

* * * * *